US012589646B2

(12) United States Patent　　　　　(10) Patent No.:　US 12,589,646 B2

Harter　　　　　　　　　　　　　　(45) Date of Patent:　　Mar. 31, 2026

(54) AIR GUIDING DEVICE OF A MOTOR VEHICLE BODY OF A MOTOR VEHICLE

(71) Applicant: Dr. Ing. h.c. F. Porsche Aktiengesellschaft, Stuttgart (DE)

(72) Inventor: Sebastian Harter, Weissach (DE)

(73) Assignee: Dr. Ing. h.c. F. Porsche Aktiengeseiischaft (DE)

( * ) Notice:　Subject to any disclaimer, the term of this patent is extended or adjusted under 35 U.S.C. 154(b) by 246 days.

(21) Appl. No.: 18/232,907

(22) Filed: Aug. 11, 2023

(65) Prior Publication Data

US 2024/0092162 A1　　Mar. 21, 2024

(30) Foreign Application Priority Data

Sep. 21, 2022　(DE) ..................... 10 2022 124 179.3

(51) Int. Cl.
B60K 11/08　　　(2006.01)
(52) U.S. Cl.
CPC .................................. B60K 11/085 (2013.01)
(58) Field of Classification Search
CPC ................................................... B60K 11/085
USPC ......................................................... 180/68.1
See application file for complete search history.

(56) References Cited

U.S. PATENT DOCUMENTS

| | | | | |
|---|---|---|---|---|
| 1,699,020 | A | * | 1/1929 | Raleigh ..................... F01P 7/10 |
| | | | | 49/77.1 |
| 6,660,969 | B2 | | 12/2003 | Ozawa et al. |

| | | | | |
|---|---|---|---|---|
| 8,733,484 | B1 | * | 5/2014 | Klop .................... B60K 11/085 |
| | | | | 180/68.1 |
| 9,447,719 | B2 | | 9/2016 | Kiener et al. |
| 9,556,783 | B2 | * | 1/2017 | Sigurdson ............ B60K 11/085 |
| 9,707,839 | B2 | * | 7/2017 | Knauer ................ B60K 11/085 |
| 9,758,031 | B2 | * | 9/2017 | Edwards .............. B60K 11/085 |
| 10,906,389 | B2 | * | 2/2021 | Herlem ................ B60K 11/085 |
| 11,167,636 | B2 | * | 11/2021 | Morita .................... F01P 11/20 |
| 12,337,677 | B2 | * | 6/2025 | Harter .................. B60K 11/085 |

(Continued)

FOREIGN PATENT DOCUMENTS

| | | |
|---|---|---|
| DE | 2114106 A1 | 11/1970 |
| DE | 10233408 A1 | 5/2003 |

(Continued)

OTHER PUBLICATIONS

German Examination Report issued Nov. 28, 2025, by the German Patent and Trademark Office in corresponding German Patent Application No. 10 2022 124 179.3 with an English translation. (16 pages).

*Primary Examiner* — Hau V Phan

(74) *Attorney, Agent, or Firm* — Buchanan Ingersoll & Rooney PC

(57)　　　　　　　ABSTRACT

An air guiding device of a motor vehicle body of a motor vehicle includes a slat assembly. The slat assembly includes at least two slats, which are arranged so as to be borne rotatably about their axis of rotation in a frame of the air guiding device, and wherein, for rotation about the axis of rotation, the slat has a first bearing point and a second bearing point configured so as to lie opposite the first bearing point. For the rotatable bearing in the frame, the first bearing point of a first coupling point of the frame and the second bearing point of a second coupling point of the frame are arranged opposite one another. The slat is configured so as to absorb tensile and compressive forces.

16 Claims, 5 Drawing Sheets

(56) References Cited

U.S. PATENT DOCUMENTS

| | | | | |
|---|---|---|---|---|
| 2011/0070817 A1* | 3/2011 | Walters | .................. | F01P 7/10 |
| | | | | 454/155 |
| 2012/0074729 A1* | 3/2012 | Fenchak | .............. | B60K 11/085 |
| | | | | 296/193.1 |
| 2013/0068403 A1* | 3/2013 | Fenchak | .............. | B60K 11/085 |
| | | | | 160/218 |
| 2013/0223980 A1 | 8/2013 | Pastrick et al. | | |
| 2013/0333501 A1* | 12/2013 | Knauer | .................. | F16H 21/44 |
| | | | | 74/102 |
| 2014/0045418 A1 | 2/2014 | Schneider | | |
| 2015/0152774 A1* | 6/2015 | Ritz | .................. | B60K 11/085 |
| | | | | 454/155 |
| 2020/0346538 A1 | 11/2020 | Lindberg et al. | | |
| 2021/0316598 A1* | 10/2021 | Pacher | ................ | B60H 1/3421 |
| 2022/0080804 A1* | 3/2022 | Kamm | .............. | B60H 1/00678 |

FOREIGN PATENT DOCUMENTS

| | | | |
|---|---|---|---|
| DE | 102013007158 A1 | 11/2013 |
| DE | 102012213992 A1 | 2/2014 |
| DE | 102015216924 A1 | 3/2017 |
| DE | 102018202116 A1 | 8/2019 |
| EP | 3870465 A1 | 9/2021 |
| WO | 2020088000 A1 | 5/2020 |

* cited by examiner

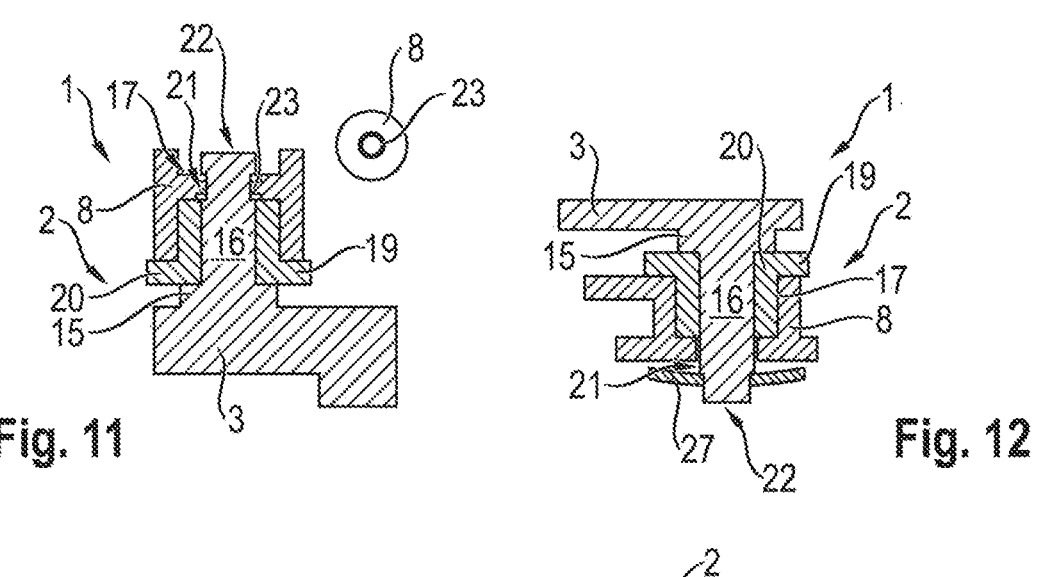
Fig. 11
Fig. 12
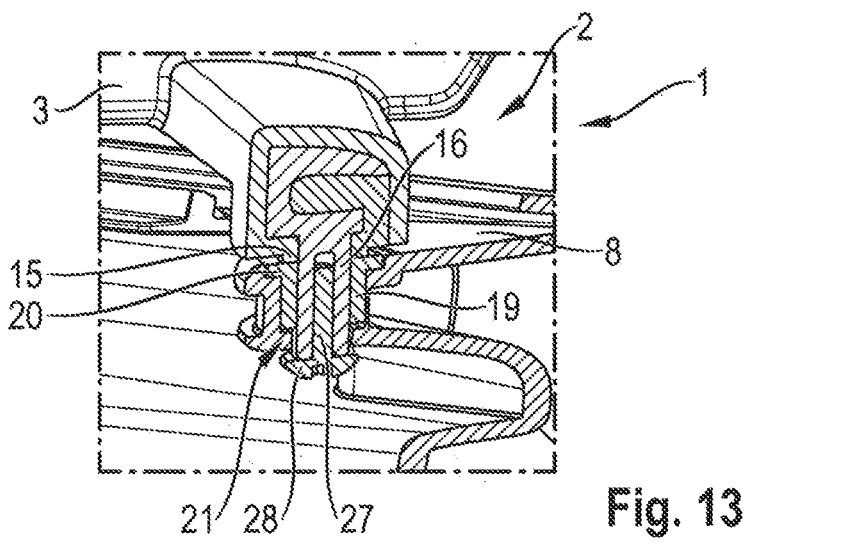
Fig. 13
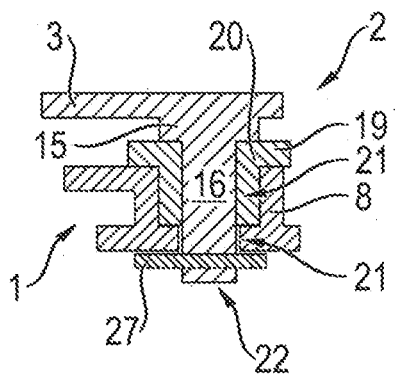
Fig. 14
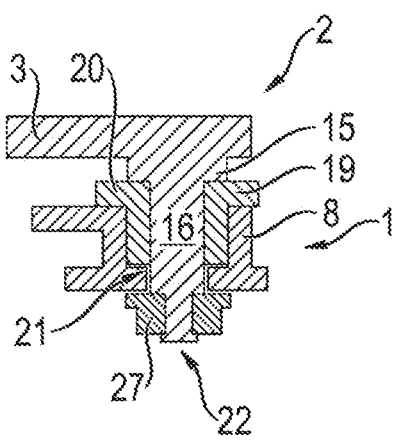
Fig. 15

AIR GUIDING DEVICE OF A MOTOR VEHICLE BODY OF A MOTOR VEHICLE

CROSS-REFERENCE TO RELATED APPLICATION

This application claims priority to German Patent Application No. 10 2022 124 179.3, filed Sep. 21, 2022, the content of such application being incorporated by reference herein in its entirety.

FIELD OF THE INVENTION

The invention relates to an air guiding device of a motor vehicle body of a motor vehicle.

BACKGROUND OF THE INVENTION

Air guiding devices used in order to influence an air flow around and/or through the motor vehicle body are known. Air guiding devices are used in a front region of the motor vehicle body, wherein they allow a defined air flow to be achieved in the front region of the motor vehicle body, e.g., for a flow of air into a cooling unit of the motor vehicle, or for cooling the brakes of the motor vehicle.

Flow channels of the air guiding devices in the front region equipped with a slat assembly are known, the slat assembly preferably being movable, so that the inlet opening configured in the front region of the motor vehicle body is variable and therefore controllable with the aid of the air guiding device. A flow cross-section of the flow channel can thus be changed with the aid of the slat assembly, for example, so that an air resistance coefficient and an energy demand of the motor vehicle depending on the air resistance coefficient can be reduced, which, for example, increases the range of the motor vehicle. Individual slats of the slat assembly are connected with the aid of a common push rod, which is typically moved in the axial direction to initiate a common rotational movement of the slats. The slats are held in a frame of the slat assembly in such a manner that they can rotate. A deformation of the frame occurring along an axis of rotation of the slats is possible, for example during assembly or during operation, which is to be stabilized.

DE 10 2015 216 924 A1, which is incorporated by reference herein, discloses an air guiding device of a motor vehicle body of a motor vehicle, whose slat assembly has a module frame and a plurality of slats rotatably borne on the module frame, wherein the slats are connected to the module frame by means of a respective detent connection.

DE 102 33 408 A1, which is incorporated by reference herein, discloses a motor vehicle body of a motor vehicle with a slat device comprising a frame and a plurality of slats, which can be releasably attached to the frame, wherein the slats are mounted on both sides rotatably on the frame via an axial projection projecting into an opening of the frame. The slats are each axially fixed to the frame by a retaining ring mounted on the axial projection.

US 2013/223 980 A1, which is incorporated by reference herein, discloses a motor vehicle body having a slat device with a plurality of slats attached to a frame in a detent.

DE 2 114 106 A1, which is incorporated by reference herein, discloses a slat which is rotatably borne on a frame via an annular flange arranged on an axial end and a hinge bolt that can be inserted through the annular flange and inserted into the slat.

DE 10 2018 202 116 A1, which is incorporated by reference herein, discloses a motor vehicle body with a cooling grid structure with contour-soft and contour-instable rod elements, wherein the contour-soft rod elements can be loaded with tensile and compressive stress and the contour-instable rod elements can be loaded with only tensile stress.

SUMMARY OF THE INVENTION

An air guiding device of a motor vehicle body of a motor vehicle according to aspects of the invention comprises a slat assembly, wherein the slat assembly comprises at least two slats, which are arranged in a frame of the air guiding device in a manner which permits them to rotate about their axis of rotation. For rotation about the axis of rotation, the slat has a first bearing point and a second bearing point configured so as to lie opposite the first bearing point, wherein, for rotatable bearing in the frame, the first bearing point of a first coupling point of the frame and the second bearing point of a second coupling point of the frame are arranged opposite one another. According to aspects of the invention, the slat is configured so as to absorb tensile and compressive forces, wherein, in order to transmit the tensile and/or compressive forces, at least one of the bearing points and/or one of the coupling points comprises a first means and/or a second means for absorbing the compressive and/or tensile forces. The essential advantage of the invention can be seen in the fact that a bearing element, which is typically configured so as to avoid deformation of the slat assembly and is a supplementary component of the slat assembly, can be omitted, because the slat is already rigid and configured so as to absorb tensile and compressive forces. For the secure transfer of the absorbed forces, means are provided which can pass these absorbed forces to the frame. These means can be kept very small. This can in particular reduce manufacturing costs.

An inexpensive first means for absorbing compressive forces in the direction of a longitudinal axis of the slat is configured in the form of a landing configured on the slat extending in the direction of a longitudinal axis of the slat.

The first means is configured on a bearing pin of the slat for direct transfer of the compressive forces into the frame. That is to say, in other words, that the bearing pin, which has the axis of rotation, comprises the first means, in particular the landing. Or in other words, the landing is configured on the bearing pin.

A bearing element is provided between the first means and the frame in order to improve the bearing and rotation of the slat. A bearing element need not necessarily be configured, provided that materials of the slat and frame suitable for the preferred frictional bearings are selected, in particular at the bearing points or coupling points. This could be, for example, the plastics POM or PFTE.

In order to ensure that tolerances, in particular production-related tolerances, are compensated, it is advantageous to provide a gap that extends along the longitudinal axis of the slat, which is formed between the first means and the frame or—if a bearing element is configured between the first means and the bearing element—between the first means and the frame.

For the preferred force absorption and transfer, the first means is covered entirely by the frame or—if a bearing element is configured between the first means and the frame—by the bearing element in the radial direction.

A further inexpensive embodiment of the air guiding device according to aspects of the invention can be achieved when, for absorbing tensile forces between the slat and the frame, a detent connection between the slat and the frame can be produced with the aid of the second means. With the detent connection, a positive locking can be achieved in a simple way, which allows the slat to be rotated in the frame, but limits the possible axial movement along the axis of rotation.

For this purpose, the second means is to be designed cost-efficiently in the form of an undercut formed on the slat, which is preferably configured on the bearing pin. The undercut can be configured in the form of an annular groove surrounding the bearing pin. Engaging into the undercut, a connecting element on the frame is provided, in particular in an opening configured so as to accommodate the bearing pin. This connecting element can be configured elastically for ease of assembly. The bearing pin could also be configured elastically, for example by pressing it together, so that the connecting element can engage with the undercut.

The second means, the undercut, can advantageously be configured with the aid of a supplementary means. For example, a simple plug-in connection between the slat and the frame can be realized, wherein a secured connection for the transfer of tensile force is brought about by the supplementary means. This results in a cost-effective assembly.

For an improved and simplified, and thus inexpensive assembly, the slat or frame is configured so as to be elastically deformable.

BRIEF DESCRIPTION OF THE DRAWINGS

Further advantages, features, and details of the invention are shown in the following description of preferred exemplary embodiments as well as the drawings. The features and feature combinations specified in the foregoing description, as well as the features and feature combinations specified hereinafter in the description of the drawings and/or shown alone in the drawings, are able to be used not only in the respectively indicated combination, but also in other combinations, or on their own, without departing from the scope of the invention. Shown are.

DETAILED DESCRIPTION OF THE INVENTION

Figure 1:
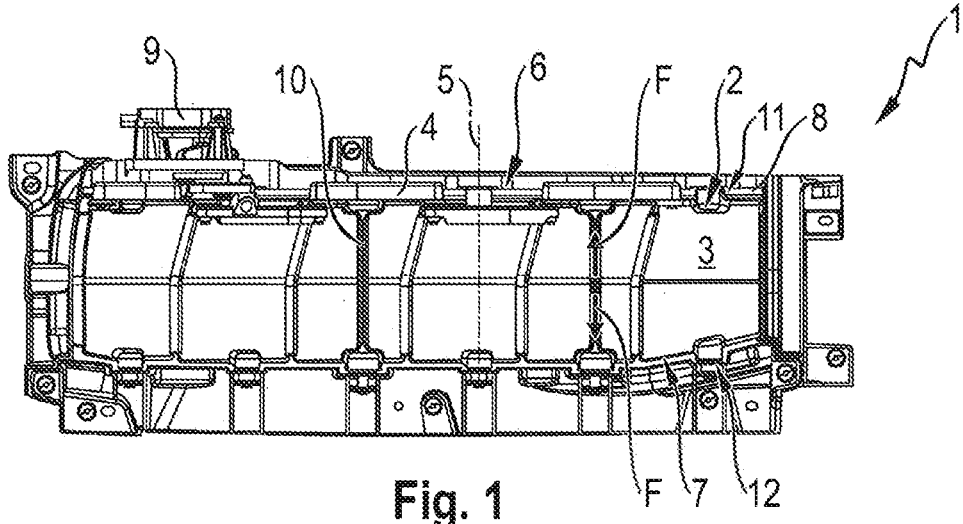
FIG. 1 in a rear view, an air guiding device of a motor vehicle body of a motor vehicle according to the prior art, in a closed position, FIG. 2 in a cross-section, an air guiding device of a motor vehicle body of a motor vehicle according to aspects of the invention in a first exemplary embodiment, in a closed position, FIG. 3 in a detail view III, a first bearing point of a slat and a first coupling point of a frame of the air guiding device according to FIG. 2, FIG. 4 in a detail view IV, a second bearing point of the slat and a second coupling point of the frame of the air guiding device according to FIG. 2, FIG. 5 in a schematic diagram, the first bearing point and the first coupling point according to the first exemplary embodiment of the air guiding device according to aspects of the invention, FIG. 6 in a schematic diagram, the first bearing point and the first coupling point in a second exemplary embodiment of the air guiding device according to aspects of the invention, FIG. 7 in a schematic diagram, the first bearing point and the first coupling point in a third exemplary embodiment of the air guiding device according to aspects of the invention, FIG. 8 in a schematic diagram, the first bearing point and the first coupling point in a fourth exemplary embodiment of the air guiding device according to aspects of the invention, FIG. 9 in a schematic diagram, a section and a top plan view of the first bearing point and the first coupling point in a fifth exemplary embodiment of the air guiding device according to aspects of the invention, FIG. 10 in a schematic diagram, a section and a top plan view of the first bearing point and the first coupling point in a sixth embodiment and a seventh embodiment of the air guiding device according to aspects of the invention, FIG. 11 in a schematic diagram, a section and a top plan view of the first bearing point and the first coupling point in an eighth embodiment of the air guiding device according to aspects of the invention, FIG. 12 in a schematic diagram, the second bearing point and the second coupling point in a ninth exemplary embodiment of the air guiding device according to aspects of the invention, FIG. 13 in a schematic diagram, the second bearing point and the second coupling point in a tenth exemplary embodiment of the air guiding device according to aspects of the invention, FIG. 14 in a schematic diagram, the second bearing point and the second coupling point in an eleventh exemplary embodiment of the air guiding device according to aspects of the invention, FIG. 15 in a schematic diagram, the second bearing point and the second coupling point in a twelfth exemplary embodiment of the air guiding device according to aspects of the invention, FIG. 16 in a perspective view, an excerpt of the air guiding device according to aspects of the invention according to the tenth exemplary embodiment with the direction of view from the top, and FIG. 17 in a perspective view, an excerpt of the air guiding device according to aspects of the invention according to the tenth exemplary embodiment with the direction of view from the bottom.

An air guiding device 1 of a motor vehicle body of a motor vehicle according to the prior art, which is not shown in greater detail, is configured as shown in a rear view in FIG. 1, wherein it is illustrated in a closed position in FIG. 1. The air guiding device 1 is accommodated in an inlet opening of the motor vehicle body, in particular in an inlet opening configured in the front of the motor vehicle body, and, in the depicted embodiment, comprises a slat assembly 2 having six slats 3.

In each case, two slats 3 are synchronously adjustable with one another using a coupling rod 4 and each have an axis of rotation 5, wherein they are connected to the coupling rod 4 so as to be rotatable about the axis of rotation 5.

In principle, a movement of the slats 3 is a rotational movement or a pivoting movement about the axis of rotation 5 of said slats. The slats 3, which are designed, both conventionally and as shown, to be predominantly plate-like, are rotatably borne in a frame 8 of the slat assembly 2 at their first end 6 and at their second end 7, which is configured so as to face away from the first end 6. In this frame 8, the slats 3 are rotatably accommodated, wherein each slat 3 has a first bearing point 11, which is typically configured at its first end 6, and a second bearing point 12, which is typically configured at its second end 7. The bearing points 11, 12 are arranged opposite a respective coupling point 13, 14 associated with the frame 8. That is to say, in other words, that the first bearing point 11 is configured so as to lie opposite the first coupling point 13 and the second bearing point 12 is configured so as to lie opposite the second coupling point 14.

The rotational movement, for which the slats 3 are designed so as to be synchronously activated, is initiated by an actuator 9 of the air guiding device 1 on one of the slats 3 and transferred to the remaining slats 3 with the aid of the push rod 4.

In order to avoid deformation of the slat assembly 2 due to forces F acting on the slat assembly 2, in particular along the axis of rotation 5, the slat assembly 2 is associated with at least one rod-shaped support element 10.

Figure 2:
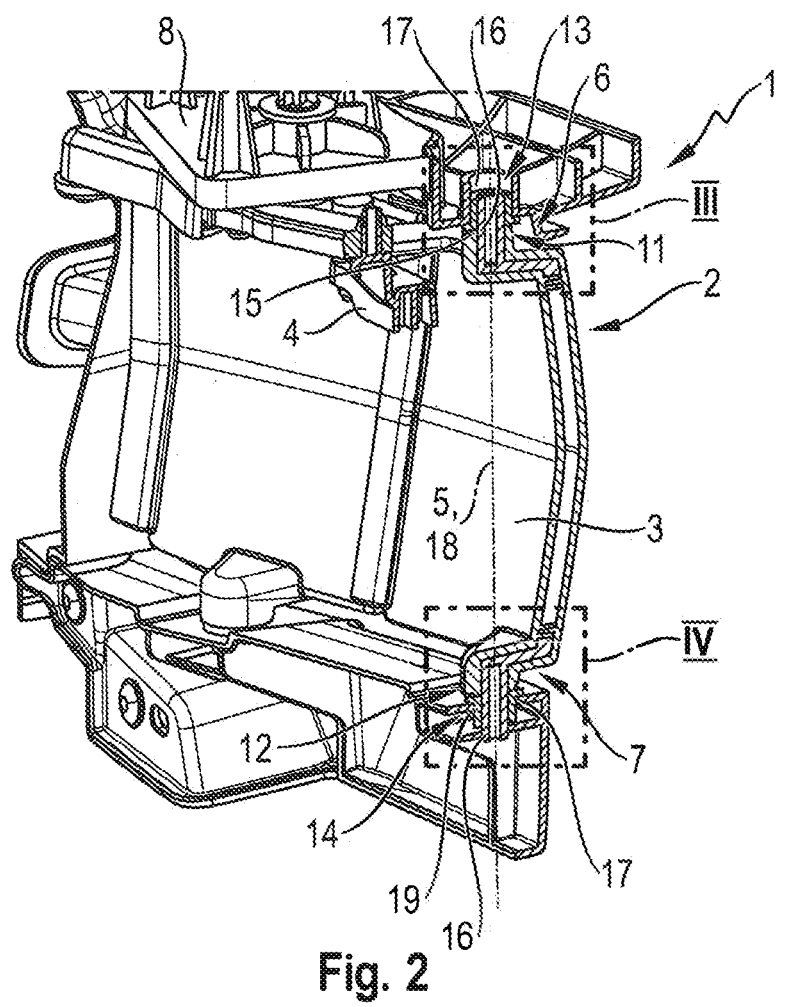

FIG. 2 illustrates, in a cross-section, an air guiding device 1 of a motor vehicle body of a motor vehicle according to aspects of the invention in a closed position. The slat 3 of the air guiding device 1 according to aspects of the invention is configured so as to absorb tensile and compressive forces and thus to avoid deformation of the frame 8 due to arising aerodynamic forces, in particular tensile and compressive forces. That is to say, in other words, that the slat 3 is designed so as to be rigid in order to absorb arising aerodynamic forces and can also absorb tensile and compressive forces F due to this design. In order to transfer these forces F between the slat 3 and the frame 8, the slat 3 has, on at least one of its bearing points 11, 12, a first means 15 for absorbing compressive forces and a second means 21 for absorbing tensile forces.

The bearing point 11, 12 of the slat 3 has a bearing pin 16, which is cylindrical or hollow cylindrical in form, for the simple realization of the rotation. In order to accommodate the bearing pin 16, the frame 8 has an opening 17 on its coupling point 13, 14 which is opposite the bearing point 11, 12, into which opening the bearing pin 16 can be inserted. In other words, the opening 17 is configured so as to absorb the bearing pin 16.

Figure 3:
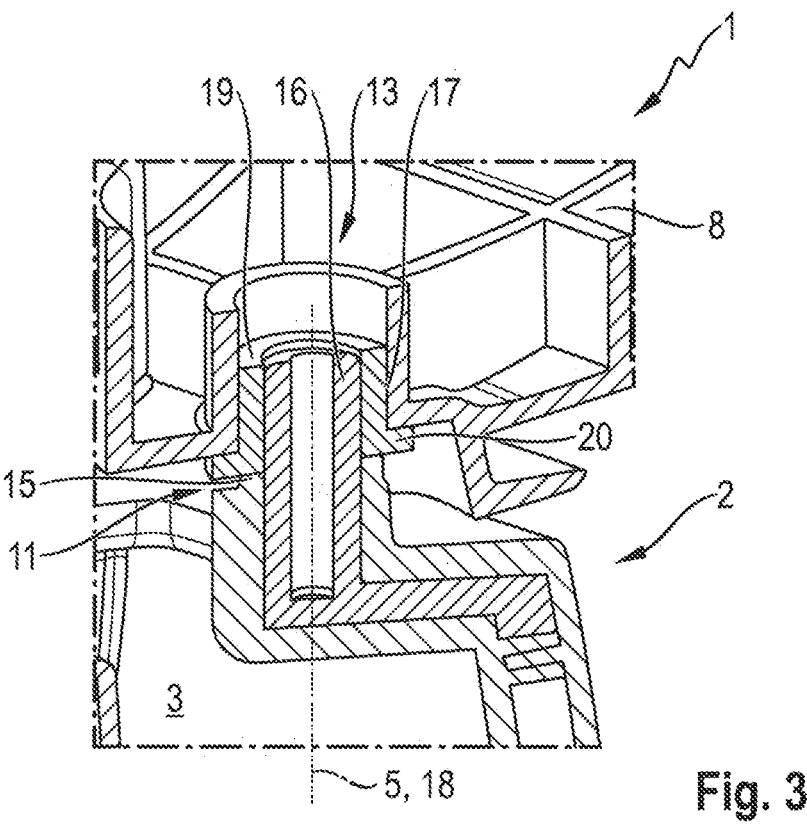
Figure 4:
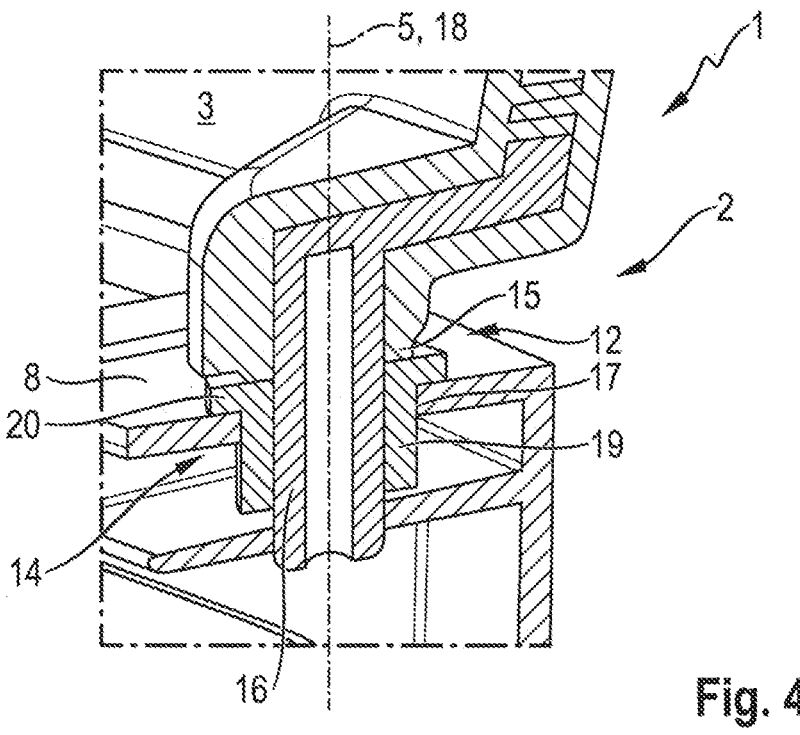

For an improved view, FIGS. 3 and 4 illustrate the first bearing point 11 and the first coupling point 13 and the second bearing point 12 and the second coupling point 14 in a detail view, a detail view III, and a detail view IV, respectively.

The first means 15, which is provided for absorbing compressive forces in the direction of a longitudinal axis 18 of the slat 3, is configured in the present exemplary embodiment in the form of a landing configured on the slat 3. This landing 15 is configured as a ring comprising the bearing pin 16. That is to say, in other words, the first means 15 for absorbing compressive forces in the direction of the longitudinal axis 18 is configured in the form of a landing configured on the slat 3 extending along a longitudinal axis 18.

In order to improve the low-friction rotation of the slat 3, a bearing element 19 is configured in the form of a sliding bearing bushing between the landing 15, thus between the first means 15, and the opening 17. The bearing pin 16 is configured in the form of a hollow cylinder.

The bearing element 19, which is accommodated in the opening 17 in a rotation-proof manner, has an annular flange 20 facing the landing 15, with which it is supported on the landing 15, wherein it is configured so as to accommodate the bearing pin 16.

Figures 5, 6, 7, 8, 9, 10:
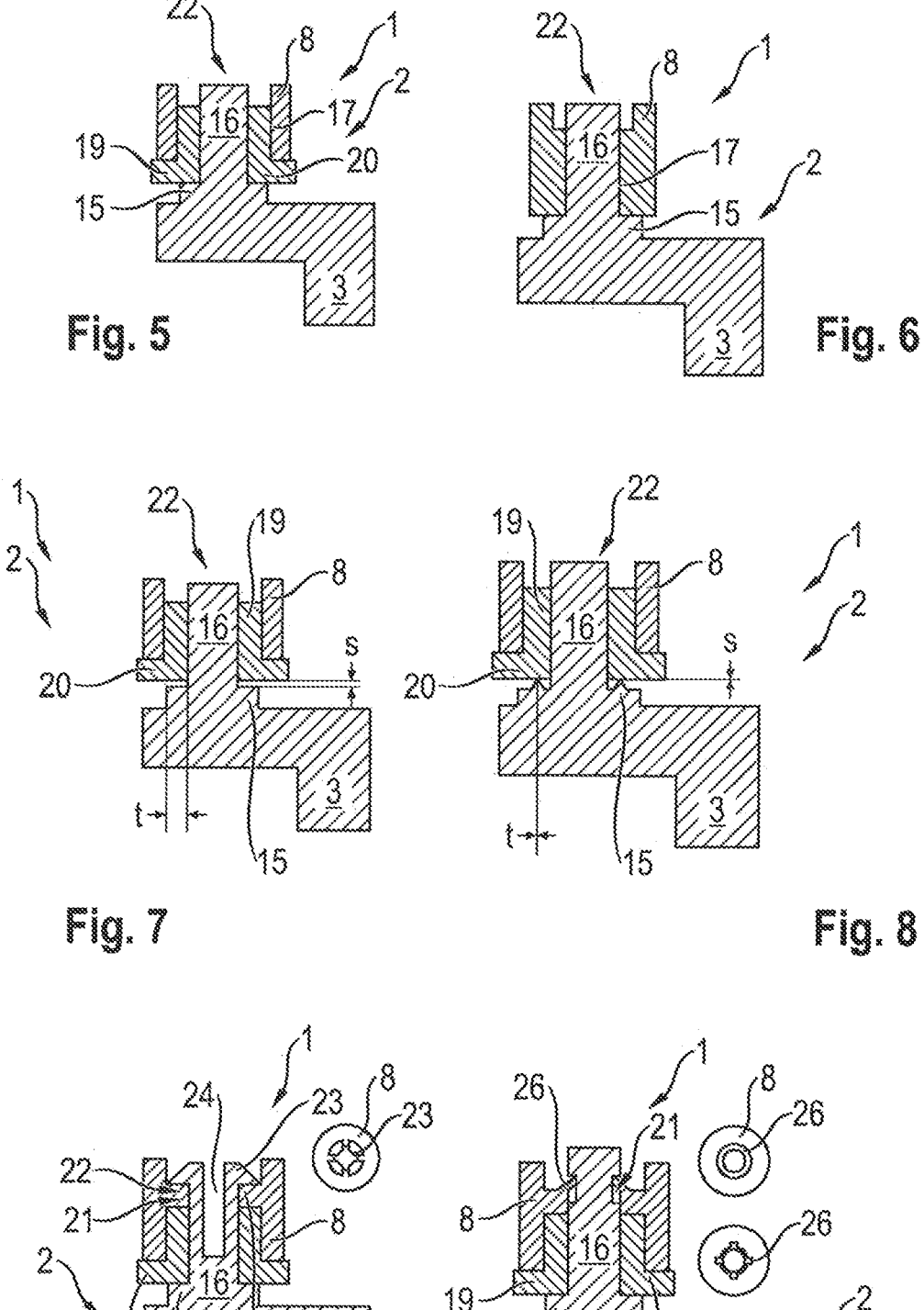

FIGS. 5 to 11 illustrate the air guiding device 1 according to aspects of the invention in various exemplary embodiments in schematic diagrams, wherein the first bearing point 11 and the first coupling point 13 are respectively depicted. FIGS. 5 to 8 illustrate the air guiding device 1 according to aspects of the invention in exemplary embodiments for absorbing compressive forces, wherein it is depicted in FIGS. 9 to 11 in exemplary embodiments for absorbing tensile forces.

In FIG. 5, the air guiding device 1 according to aspects of the invention is depicted according to the first exemplary embodiment. For improved sliding friction, the bearing element 19 is arranged between the first means 15 configured in the form of the landing and the opening 17, thus between the first means 15 and the frame 8.

The air guiding device 1 according to aspects of the invention could also be configured without the bearing element 19, as illustrated in FIG. 6 in a second exemplary embodiment of the air guiding device 1 according to aspects of the invention.

For tolerance reasons, however, a gap s can also be retained between the annular flange 20 and the landing 15, wherein the gap s extends along the longitudinal axis 18. Likewise, an overlap t is possible according to a bias between the annular flange 20 and the landing 15.

The air guiding device 1 according to aspects of the invention according to a third exemplary embodiment is depicted in FIG. 7, comprising the gap s and the cover t. Likewise, only the gap s or only the cover t could be configured.

The air guiding device 1 according to aspects of the invention is depicted in FIG. 8 in a fourth exemplary embodiment, wherein a linear contact is formed between the landing 15 and the annular flange 20. If the bearing element 19 were omitted, the linear contact would be formed between the ledge 15 and the frame 8. In this embodiment, the gap s and the overlap t have a value of 0 mm. Preferably, the value of the overlap t is between 0 mm and 10 mm. The gap preferably has a value between −5 mm and 5 mm. In other words, this means that the landing 15 can also be configured so as to project into the bearing element 19 or into the frame 8.

In all exemplary embodiments presented, the first means 15, thus the landing 15, is completely covered in the radial direction by the frame 8 or the bearing element 19.

In FIGS. 9 to 11, the air guiding device 1 according to aspects of the invention is additionally depicted for the preferred absorption of tensile forces. That is to say, it is configured so as to absorb compressive and tensile forces. The second means 21, which is configured so as to absorb tensile forces, is configured so as to bring about a detent connection between the slat 3 and the frame 8. In other words, this means that a connection between the slat 3 and the frame 8 can be produced, which allows a secured movement of the slat 3 within the frame 8 to be realized.

In FIG. 9, in which the air guiding device 1 according to aspects of the invention is depicted in a fifth exemplary embodiment, the second means 21 is configured in the form of an undercut formed on the slat 3. On its pin end 22 configured so as to face the frame 8, the bearing pin 16 comprises a detent lug 23, which extends in sections over the circumference of the bearing pin 16.

FIG. 9 illustrates, in a top right section, a top plan view of the first bearing point 11 and the first coupling point 13. With the aid of the detent lug 23, the second means 21 is realized in the form of the undercut between the landing 15 and the lug 23. The bearing pin 16 has a groove 24, which extends along the longitudinal axis 18 and allows for elastic deformation of the bearing pin 16. The bearing pin can thus be inserted into the opening 17 by pressing its pin end 22 together, wherein, upon release of the pressure on the pin end 22 or the detent lug, the detent lug 23 can abut against a further landing 25, which in the present exemplary embodiment is configured in the frame 8, along the longitudinal axis 18. The bearing pin 16 is configured in the form of a so-called crown clip. Preferably, the bearing pin comprises one to four detent lugs. The detent lug 23 can transfer forces under a tensile load.

In FIG. 10, the air guiding device 1 according to aspects of the invention is depicted in a sixth exemplary embodiment and a seventh exemplary embodiment. A spring element 26 configured on the frame 8 is configured so as to engage into the second means 21 in the form of the undercut, which is formed on the bearing pin 16. The spring element 26 can be annular according to the sixth exemplary embodiment, as illustrated in the upper of the two top plans views of the first bearing point 11 and the first coupling point 13 shown on the right. That is to say, in other words, it is similar to a collar comprising the opening 17, which can elastically deform during assembly.

Likewise, the spring element 26 can be configured in sections about the circumference of the bearing pin 16, according to the seventh exemplary embodiment, as illustrated in the lower of the two top plan views. That is to say, the spring element 26 is configured in the form of a plurality of spring tabs, wherein preferably one to four spring tabs are formed on the frame 8.

An eighth exemplary embodiment of the air guiding device 1 according to aspects of the invention is depicted in FIG. 11. Detent tabs 23 are formed on the opening 17 on the frame 8, which are stiff and thus non-deformable. Preferably, 1 to 6 detent tabs 23 are arranged circumferentially to the bearing pin 16. During assembly, the opening 17 is elastically deformed with the detent tabs 23, or, in other words, it is ovalized. In other words, the frame 8 is designed so as to be elastically deformable.

In the fifth to seventh exemplary embodiments discussed above, the bearing element 19 could also function as a stop for the further landing 25, provided the bearing element 19 is securely connected to the frame 8. Thus, in the sixth and seventh exemplary embodiments, the spring element 26 could be configured on the further landing 25, and in the eighth exemplary embodiment, the detent tabs 23 could be configured on the further landing 25.

The second means 21, the undercut, can be realized with the aid of a supplementary means 27, as illustrated in FIGS. 12 to 15. In FIGS. 12 to 15, the second bearing point 12 and the second coupling point 14 are illustrated. The supplementary means 27 can be a standard component or a self-manufactured component.

The supplementary means 27, which serves to bring about the undercut, thus the second means 21, is a locking washer according to a ninth exemplary embodiment of the air guiding device 1 according to aspects of the invention depicted in FIG. 12, which can be fitted onto the bearing pin 16. The locking washer 27, which is made of a metal, e.g. sheet metal, can connect positively to the bearing pin 16. which is preferably made of a plastic, by embedding in it.

A screw as the supplementary means 27 is provided in a tenth exemplary embodiment of the air guiding device 1 according to aspects of the invention, which is depicted in FIG. 13. This can be considered the simplest option, because the screw 27 can preferably be screwed directly into the plastic. The screw 27 is preferably screwed into the bearing pin 16 up to a stop. A screw head 28 of the screw 27 realizes the undercut 21 and can robustly absorb tensile forces and introduce them into the slat 8. A so-called pine clip can also be screwed in or inserted.

FIG. 14 depicts the air guiding device 1 according to aspects of the invention according to an eleventh exemplary embodiment, wherein the supplementary means 27 is configured in the form of a so-called securing splint or a spring-type plug.

In a twelfth exemplary embodiment of the air guiding device 1 according to aspects of the invention, which is illustrated in FIG. 15, the supplementary means 27 is configured in the form of a nut.

Figure 16:
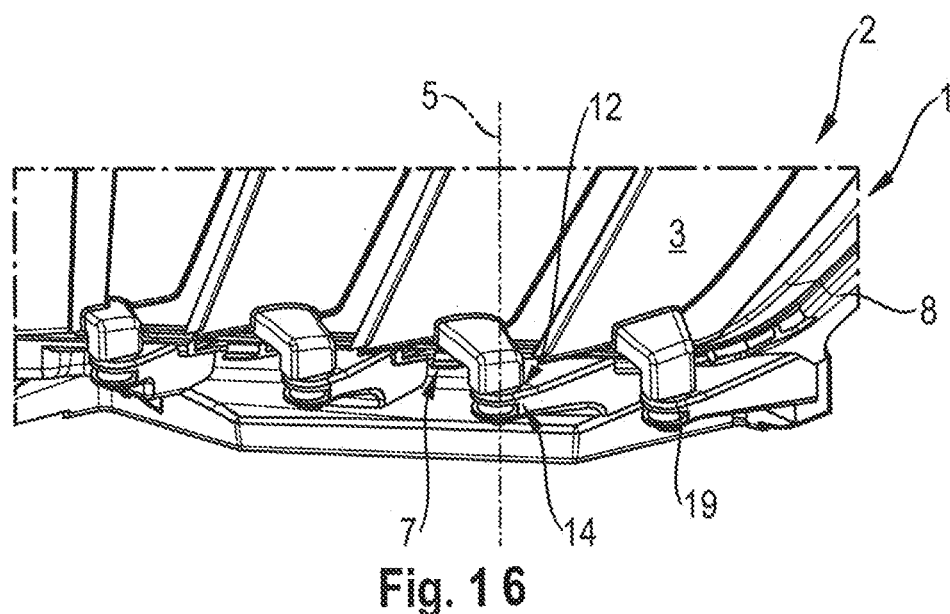
Figure 17:
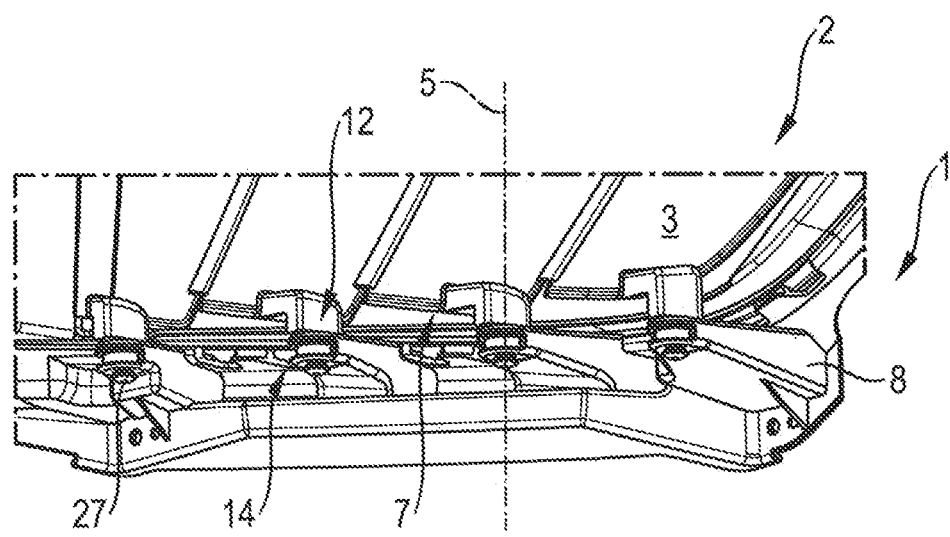

In FIGS. 16 and 17, an excerpt of the air guiding device 1 according to aspects of the invention according to the tenth exemplary embodiment is depicted in a perspective view, with the direction of view from the top and the direction of view from the bottom, wherein the supplementary means 27 is configured in the form of a screw.

For example, the frame 8 could also have a bearing pin 16 on its coupling point 13, 14, and the opening 17 could be formed on the bearing point 11, 12, wherein the means 15, 21 and features associated with the bearing points 11, 12 are then to be assigned to the coupling points 13, 14 and vice versa.

LIST OF REFERENCE NUMERALS

1 Air guiding device
2 Slat assembly
3 Slat
4 Coupling rod
5 Axis of rotation
6 First end
7 Second end
8 Frame
9 Actuator
10 Support element
11 First bearing point
12 Second bearing point
13 First coupling point
14 Second coupling point
15 First means
16 Bearing pin
17 Opening
18 Longitudinal axis
19 Bearing element
20 Annular flange
21 Second means
22 Pin end
23 Detent lug
24 Groove
25 Further landing
26 Spring element
27 Supplemental means
28 Screw head
F Force
Gap
t Overcoverage

What is claimed is:

1. An air guiding device of a motor vehicle body of a motor vehicle, said air guiding device comprising:
   a slat assembly comprising at least two slats, each slat being arranged so as to be rotatable about an axis of rotation in a frame of the air guiding device,
   wherein, each slat has a first bearing point and a second bearing point lying opposite the first bearing point,
   wherein a first coupling point of the frame and a second coupling point of the frame are arranged opposite one another, wherein the first and second bearing points lie opposite the first and second coupling points, respectively, wherein each slat is configured to absorb tensile or compressive forces, wherein, in order to transmit the tensile or compressive forces between the slat and the frame, at least one of the bearing points of a first slat of the at least two slats comprises a first means for absorbing the compressive or tensile forces, wherein the first means comprises a bearing pin and a landing disposed on the first slat that extends along the longitudinal axis of the first slat and about the bearing pin, wherein a bearing element in the form of a sliding bearing bushing is disposed between the first means and the frame, wherein the bearing element includes an opening that receives the bearing pin of the first slat, wherein the landing is positioned to face the sliding bearing bushing, and wherein the sliding bearing bushing extends in a radial direction beyond a perimeter of the landing.

2. The air guiding device according to claim 1, further comprising a gap extending along the longitudinal axis, the gap being located either (i) between the first means and the frame or (ii) between the first means and the bearing element.

3. The air guiding device according to claim 1, wherein the first means is covered entirely in a radial direction by either the frame or the bearing element.

4. The air guiding device according to claim 1, further comprising a linear contact between the first means and either the frame or the bearing element.

5. The air guiding device according to claim 1, further comprising a detent connection disposed between the first slat and the frame for absorbing tensile forces between the first slat and the frame.

6. The air guiding device according to claim 5, wherein the detent connection comprises an undercut formed on the first slat.

7. The air guiding device according to claim 1, further comprising a screw, a split, a plug, a nut or a locking washer that is configured to bring about at least a positive lock with the first slat.

8. The air guiding device according to claim 1, wherein the first slat or the frame is configured so as to be elastically deformable.

9. A motor vehicle comprising the air guiding device of claim 1.

10. The air guiding device according to claim 1, wherein the landing is formed on a free end of the first slat that faces the frame, and wherein the landing has a reduced wall thickness on the free end.

11. The air guiding device according to claim 10, wherein the bearing pin extends outwardly from the free end of the first slat.

12. The air guiding device according to claim 1, wherein the sliding bearing bushing is sandwiched in a radial direction between the bearing pin and the frame.

13. The air guiding device according to claim 1, wherein the sliding bearing bushing is sandwiched in an axial direction between the landing and the frame.

14. The air guiding device according to claim 1, wherein at least a portion of the bearing pin and the sliding bearing are disposed within a circular opening formed in the frame.

15. The air guiding device according to claim 14, wherein a free end of the bearing pin includes a detent that is configured to positively engage with a surface disposed on the circular opening of the frame for retaining the first slat to the frame.

16. The air guiding device according to claim 14, further comprising a spring element extending within the circular opening of the frame, wherein the spring element is configured to positively engage with a surface disposed on a free end of the bearing pin for retaining the first slat to the frame.

* * * * *